United States Patent
Koike

(10) Patent No.: US 10,142,501 B2
(45) Date of Patent: Nov. 27, 2018

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Hiroaki Koike, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/669,775

(22) Filed: Aug. 4, 2017

(65) Prior Publication Data

US 2017/0331967 A1    Nov. 16, 2017

Related U.S. Application Data

(63) Continuation of application No. 14/877,771, filed on Oct. 7, 2015, now Pat. No. 9,756,203.

(30) Foreign Application Priority Data

Oct. 10, 2014 (JP) ................. 2014-208877

(51) Int. Cl.
*G06F 15/00* (2006.01)
*H04N 1/00* (2006.01)

(52) U.S. Cl.
CPC ....... *H04N 1/00511* (2013.01); *H04N 1/0097* (2013.01); *H04N 1/00204* (2013.01); *H04N 1/00464* (2013.01); *H04N 1/00517* (2013.01); *H04N 1/00854* (2013.01); *H04N 1/00973* (2013.01); *H04N 2201/0094* (2013.01)

(58) Field of Classification Search
CPC ........ H04N 1/100511; H04N 1/00204; H04N 1/00464; H04N 2201/0094; H04N 1/00973; H04N 1/0097; H04N 1/00854; H04N 1/00517
USPC ...................................... 358/1.15
See application file for complete search history.

(56) References Cited

U.S. PATENT DOCUMENTS

2012/0075658 A1* 3/2012 Yasui .................. G06F 3/1207
                                                                 358/1.14

FOREIGN PATENT DOCUMENTS

JP      2001-243165 A      9/2001
JP      2006-135774 A      5/2006

\* cited by examiner

*Primary Examiner* — Saeid Ebrahimi Dehkordy
(74) *Attorney, Agent, or Firm* — Canon U.S.A., Inc. IP Division

(57) ABSTRACT

A multifunction peripheral (MFP) acquires a display setting of an operation unit in the MFP, which is associated with a user at a client terminal, when accessed from the client terminal. The MFP performs control so that display of an operation screen of the MFP in the client terminal becomes display according to the acquired display setting of the operation unit.

27 Claims, 13 Drawing Sheets

FIG. 4

| USER ID (402) | USER NAME (403) | PASSWORD (404) | ... |
|---|---|---|---|
| 001 | user1 | pass1 | |
| 002 | user2 | pass2 | |
| 003 | user3 | pass3 | |
| 004 | user4 | pass4 | |
| | | | |

| USER ID 402 | SCREEN COLOR REVERSAL 502 | AUDIO MODE 503 | DISPLAY LANGUAGE 504 | MAGNIFIER 505 | PERSONAL ADDRESS 506 |
|---|---|---|---|---|---|
| 001 | ON | ON | JAPANESE | ON | user1@test.jp |
| 002 | OFF | ON | ENGLISH | OFF | user2@test.jp |
| 003 | ON | OFF | FRENCH | OFF | user3@test.jp |
| 004 | OFF | OFF | ENGLISH | OFF | user4@test.jp |
| | | | | | |

501

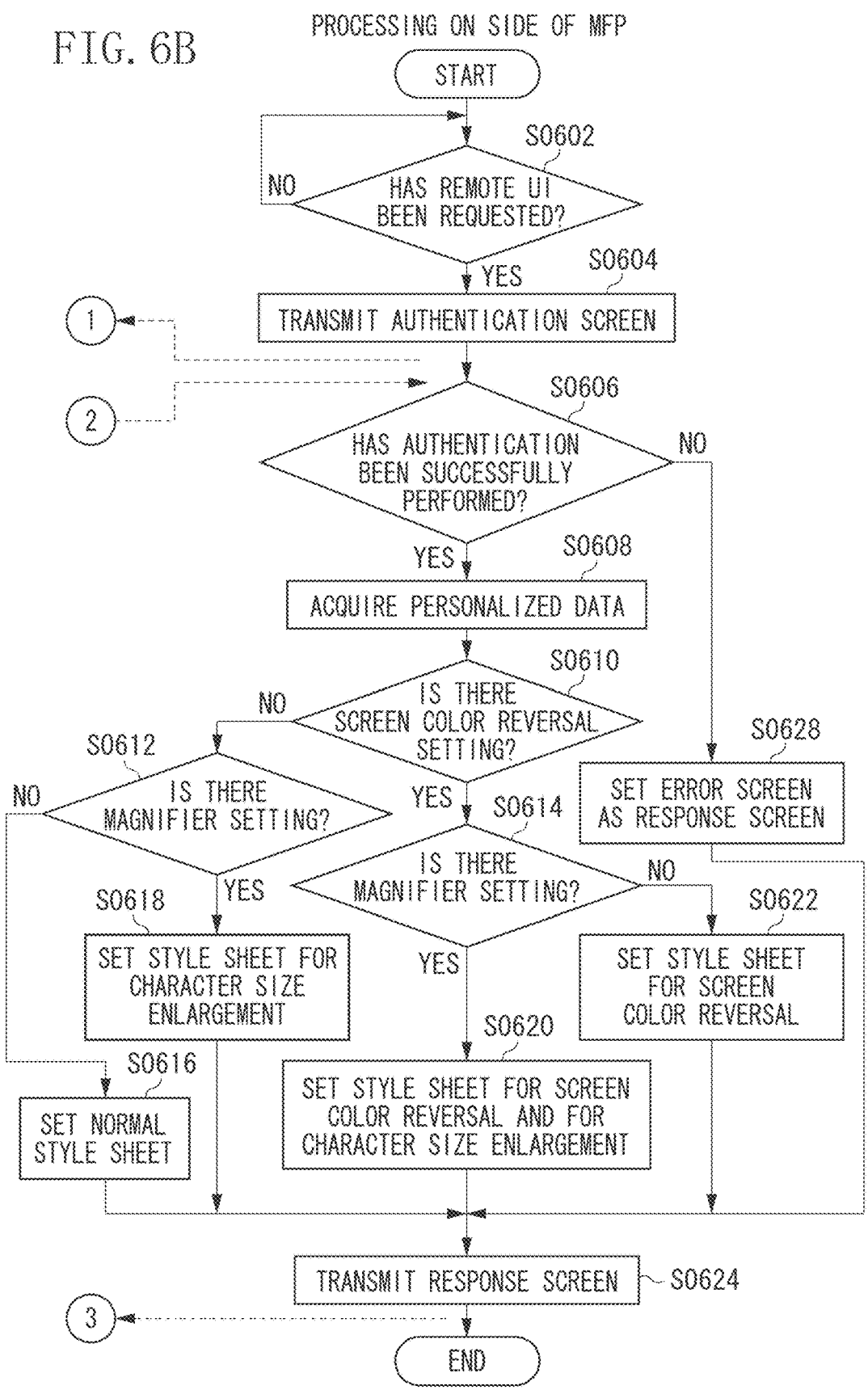

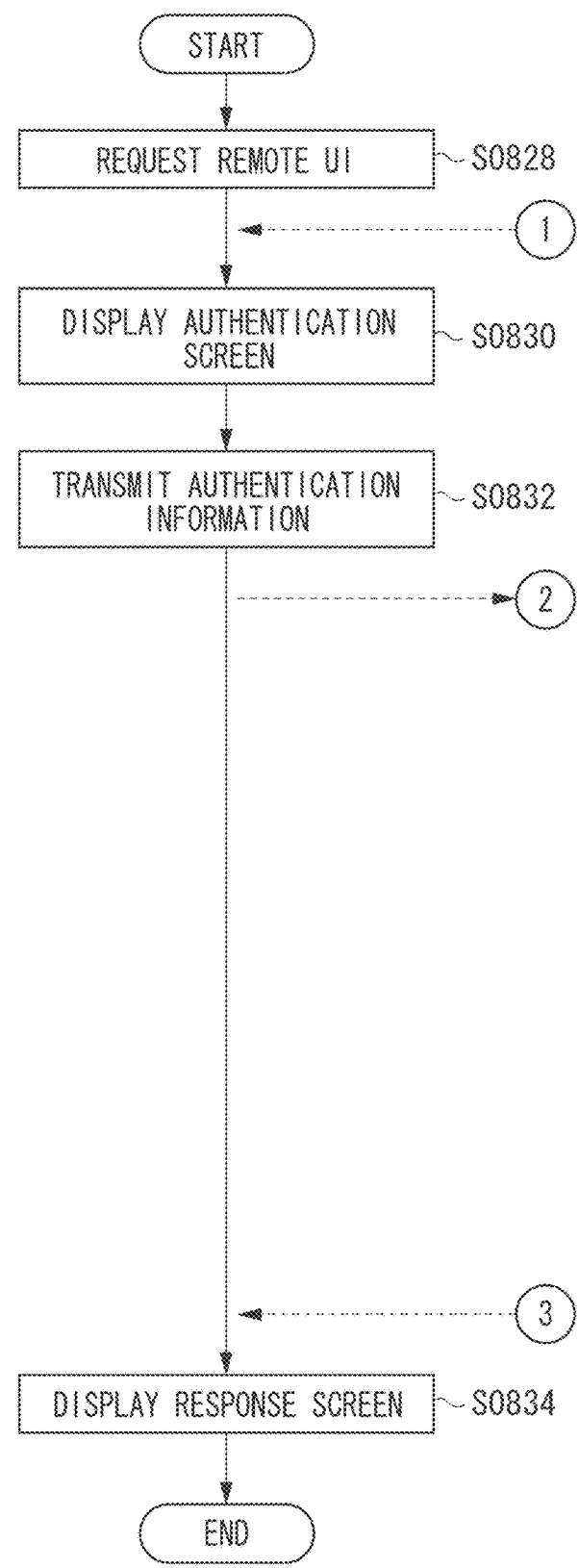

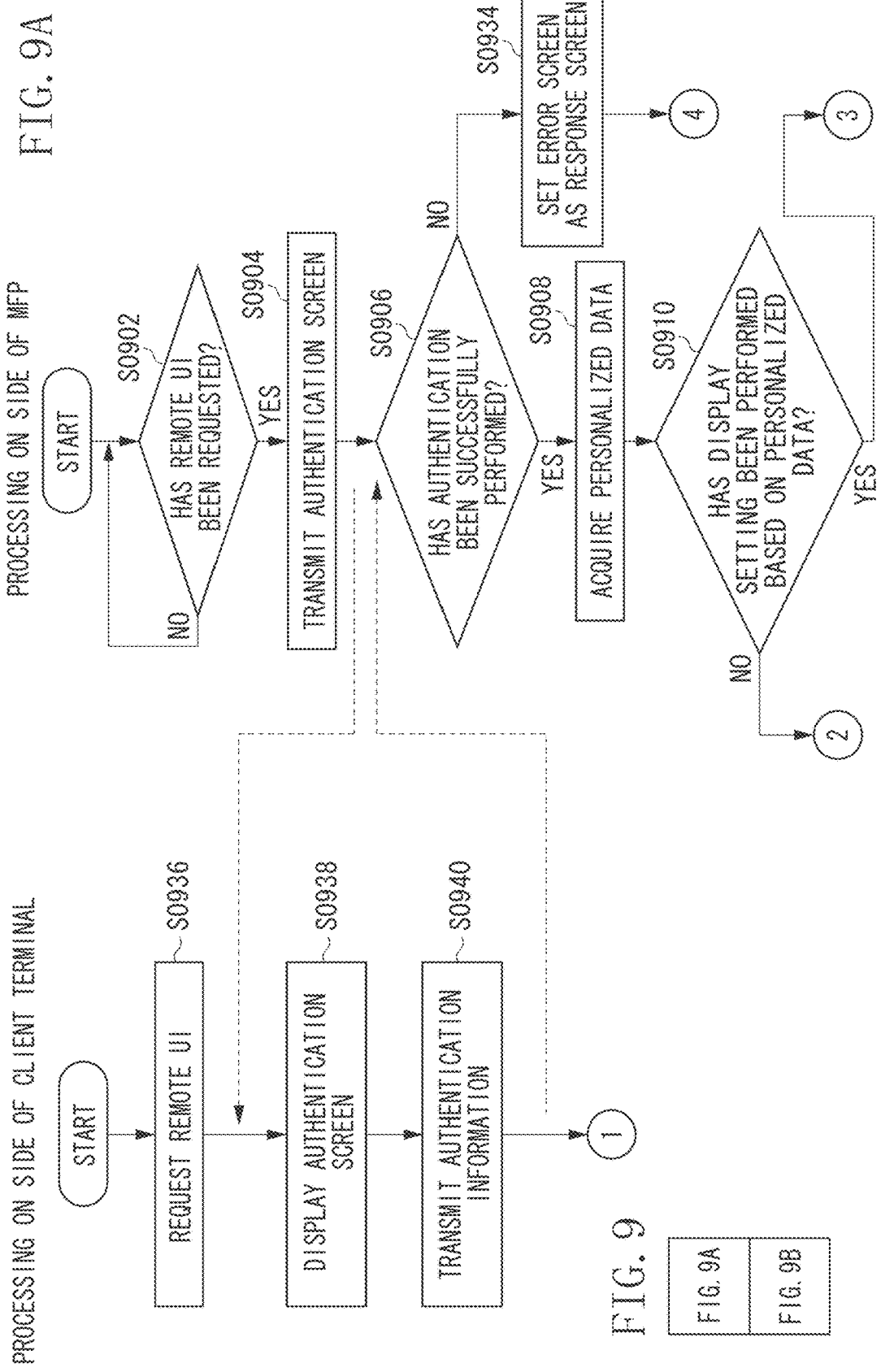

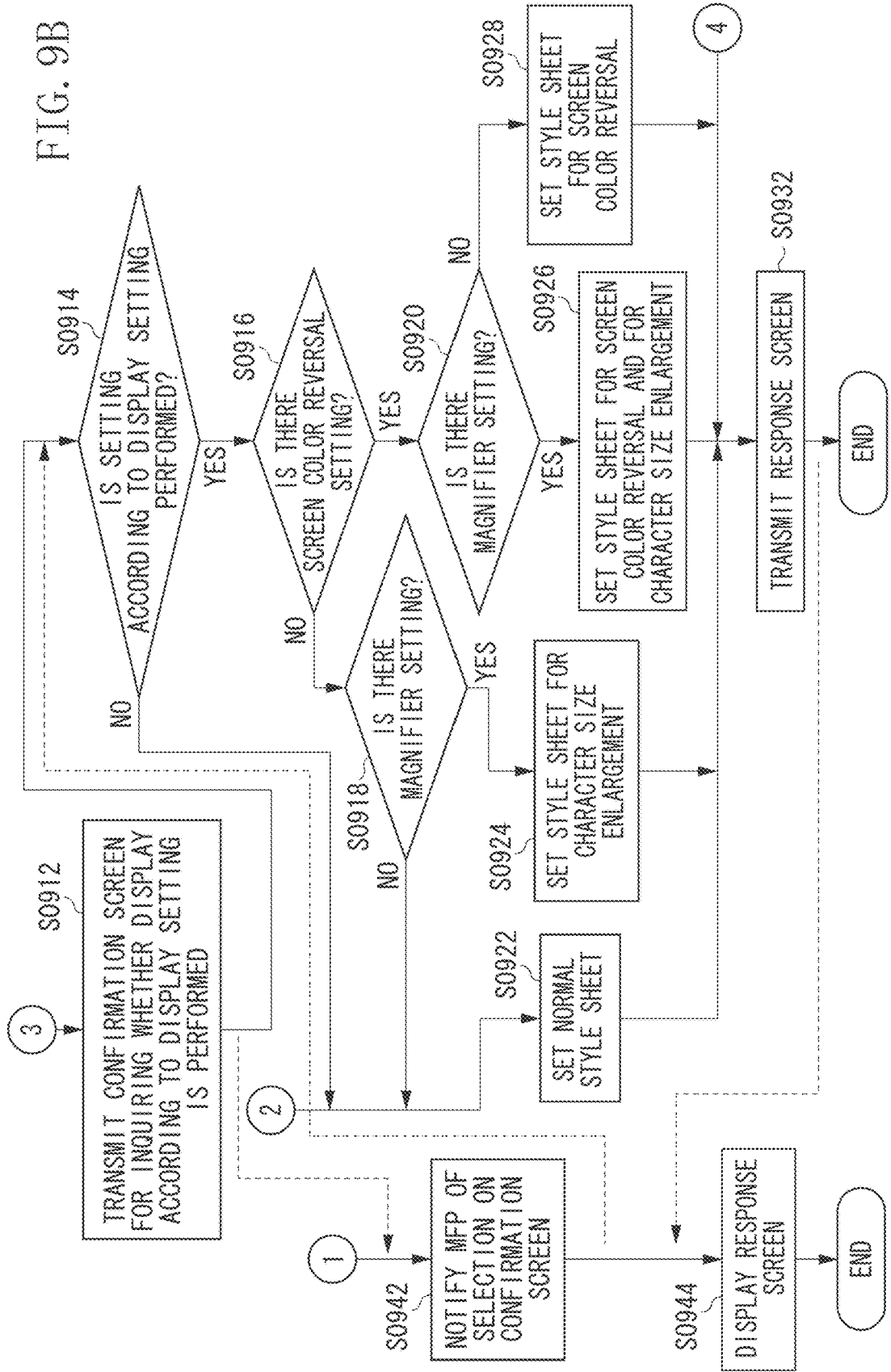

IMAGE PROCESSING APPARATUS, METHOD FOR CONTROLLING THE SAME, AND STORAGE MEDIUM

CROSS-REFERENCE TO RELATED APPLICATION

This application is a Continuation of U.S. application Ser. No. 14/877,771, filed Oct. 7, 2015 which claims priority from Japanese Patent Application No. 2014-208877, filed Oct. 10, 2014, which are hereby incorporated by reference herein in their entireties.

BACKGROUND OF THE INVENTION

Field of the Invention

The present invention relates to an image processing apparatus, a method for controlling the same, and a storage medium.

Description of the Related Art

A plurality of users shares and uses an image processing apparatus such as a printer. The user sets a display format of an operation unit in the image processing apparatus into a desired display format. If the image processing apparatus is the one in which a display language is set to Japanese, for example, a user who desires to use the apparatus in English requires an operation for first changing a setting of the display language from Japanese to English, using a desired function, and finally changing the setting of the display language from English to Japanese.

Japanese Patent Application Laid-Open No. 2001-243165 discusses a sharing information utilization system capable of commonly using display information in the same display format at a plurality of computer terminals.

When an image processing apparatus holds a display format of an operation unit for each user and a user logs in to the image processing apparatus, the image processing apparatus can perform display depending on the user by changing the display format of the operation unit into a display format associated with the user. Thus, individual display can be performed depending on the user. For example, a display color of an operation screen is reversed or display of the operation screen is made enlargeable.

On the other hand, there is an image processing apparatus including operation means by an operation unit on the side of the apparatus (that is a local user interface (LUI)) and operation means from a web browser in a client terminal (that is a remote user interface (RUI) serving as an information processing apparatus. The image processing apparatus has a function as a web server. When the web server in the image processing apparatus is accessed from the web browser in the client terminal, operation screen data for operating the image processing apparatus is returned to the web browser. When the web browser in the client terminal displays an operation screen based on the operation screen data, a user can perform input for remotely operating the image processing apparatus. Thus, device status display, job execution, and a device setting can be performed from the client terminal in a remote location.

A setting relating to the display of the operation screen displayed by the web browser follows a setting on the side of the web browser. If a display setting of the operation unit on the side of the image processing apparatus has been performed, the display setting needs to be separately performed on the side of the web browser, when the operation screen displayed by the web browser is also desired to be displayed in a similar display format. If a setting for reversing a display color in the operation unit on the side of the image processing apparatus, for example, a setting of an operating system (OS) and the web browser on the side of the client terminal needs to be changed. Every time the operation screen is desired to be displayed by accessing the web server in the image processing apparatus from a web browser in a client terminal that has not been commonly used, the user needs to perform a setting.

SUMMARY OF THE INVENTION

According to an aspect of the present invention, an image processing apparatus, which communicates with an information processing apparatus via a network, includes an acquisition unit configured to acquire a display setting of an operation unit in the image processing apparatus, which is associated with a user of the information processing apparatus, when the image processing apparatus is accessed from the information processing apparatus, and a control unit configured to perform control so that display of an operation screen of the image processing apparatus in the information processing apparatus becomes display according to the acquired display setting of the operation unit.

Further features of the present invention will become apparent from the following description of exemplary embodiments with reference to the attached drawings.

BRIEF DESCRIPTION OF THE DRAWINGS

FIG. 4 illustrates a data configuration of authentication data.

FIG. 5 illustrates a data configuration of personalized data.

FIG. 9, composed of FIG. 9A and FIG. 9B, is a flowchart illustrating operation processing of a client terminal and an MFP.

DESCRIPTION OF THE EMBODIMENTS

Figure 1:
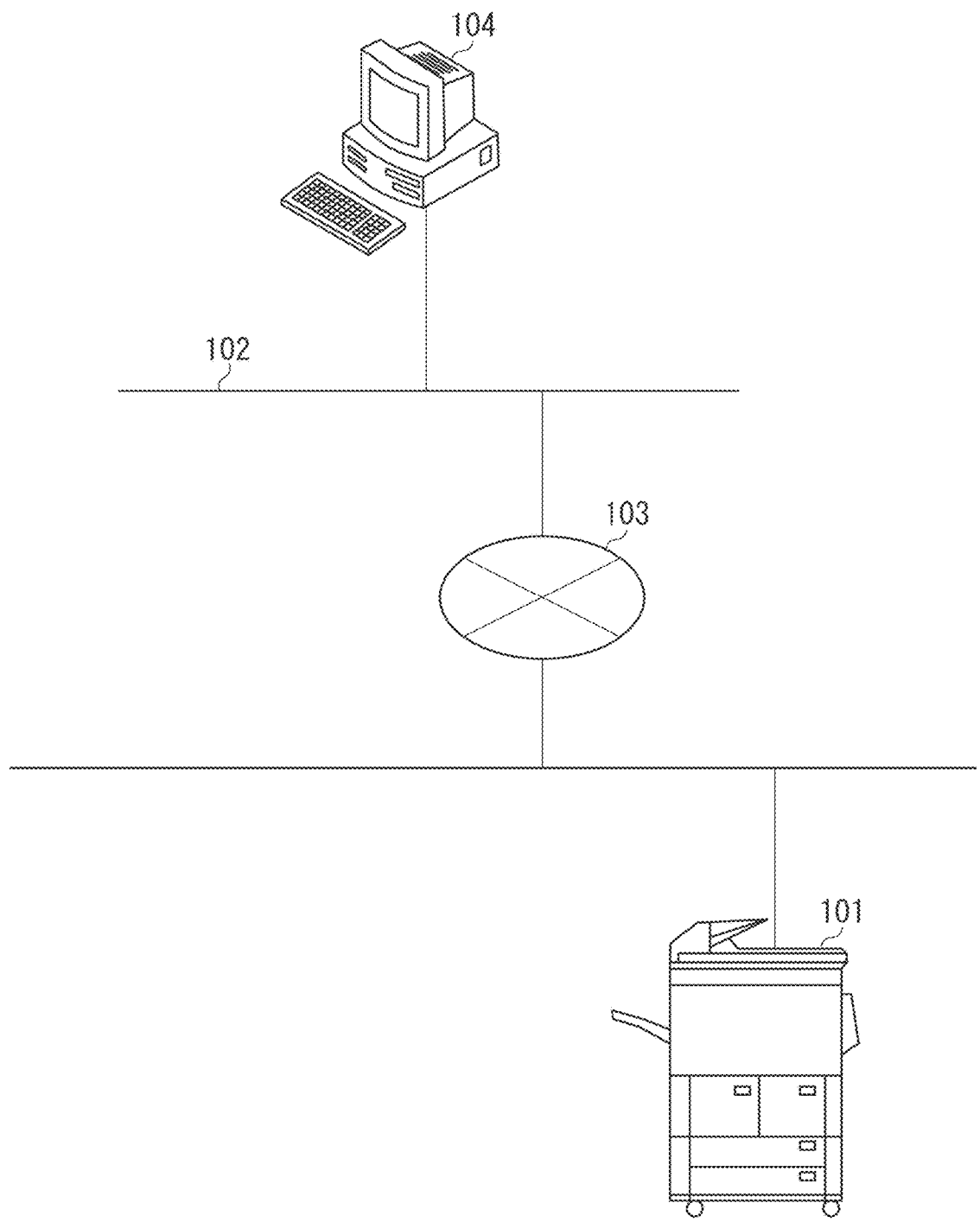
FIG. 1 illustrates a system configuration according to the present exemplary embodiment.

FIG. 1 illustrates a system configuration according to the present exemplary embodiment.

An information processing system illustrated in FIG. 1 includes a multifunction peripheral (MFP) 101 and a client terminal 104. The MFP 101 and the client terminal 104 communicate with each other via a network including a local area network (LAN) 102 and the Internet 103.

The client terminal 104 is an information processing apparatus having a web browser function capable of connecting to an external web service and operating a web application. The MFP 101 is an image processing apparatus having a copy function for scanning a paper medium, and forming and printing an image on paper based on data representing the scanning. The MFP 101 includes a web server unit having a web site function capable of providing an application that can be accessed and operated from the client terminal 104. When the web server unit is accessed from a web browser in the client terminal 104, a screen (operation screen) relating to an operation of the MFP 101 can be displayed, and device status display, job execution, and a device setting can be performed.

Figure 2:
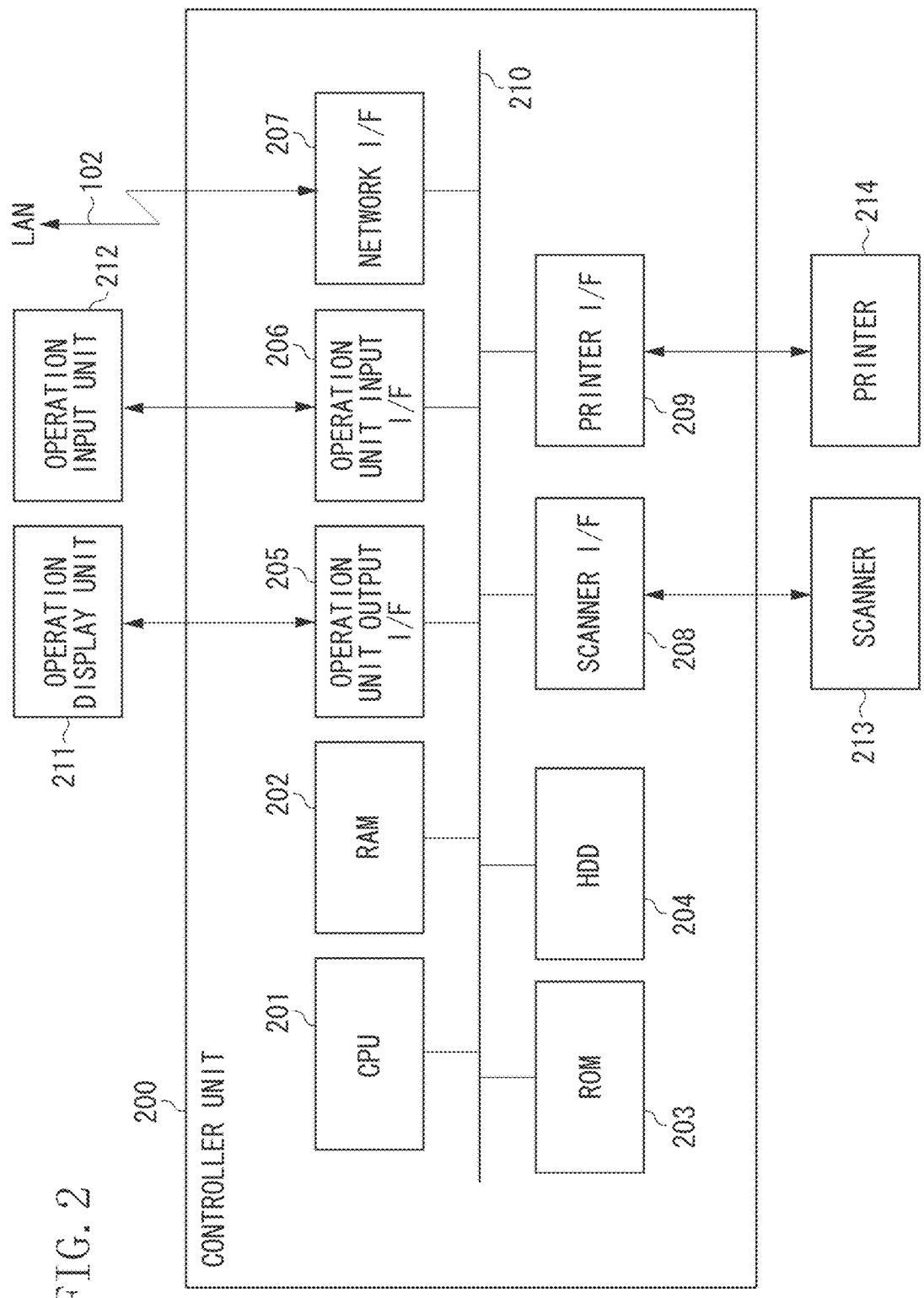
FIG. 2 illustrates an apparatus configuration of a multifunction peripheral (MFP).

FIG. 2 illustrates an apparatus configuration of the MFP 101.

The MFP 101 includes a controller unit 200 to which a scanner 213 and a printer 214 are connected while an operation display unit 211, an operation input unit 212, and the LAN 102 can be connected.

The controller unit 200 includes a central processing unit (CPU) 201 to a printer interface (I/F) 209 arranged on a system bus 210. The CPU 201 controls the entire controller unit 200. More specifically, the CPU 201 starts the information processing system based on a boot program stored in a read only memory (ROM) 203. The CPU 201 reads out a control program stored in a hard disk drive (HDD) 204, and performs predetermined processing using a random access memory (RAM) 202 as a work area.

The HDD 204 stores various types of control programs. The HDD 204 also stores scan data read from the scanner 213 and data acquired from outside the MFP 101 via a network I/F 207. An operation unit output I/F 205 controls data output communication to the operation display unit 211. An operation unit input I/F 206 controls data input communication from the operation display unit 211.

The network I/F 207 is connected to the LAN 102 to control input/output of information via the LAN 102. A scanner I/F 208 inputs image data from the scanner 213 while inputting and outputting scanner control data. The printer I/F 209 outputs output image data to the printer 214 while inputting and outputting printer control data. The devices 201 to 209 are arranged on a system bus 210.

The operation input unit 212 is an instruction input interface from a user, which includes an input device such as a touch panel or hardware keys. The operation display unit 211 is a display interface to the user, which includes a display device such as a liquid crystal display (LCD) or a light emitting diode (LED). The operation display unit 211 functions as a screen of an operation unit in the MFP 101.

The scanner 213 includes an optical reading device such as a charge coupled device (CCD), and has a function of optically operating a paper medium and reading the paper medium as electronic image data. The printer 214 has a function of forming the electronic image data as an image on a recording medium such as paper.

Figure 3:
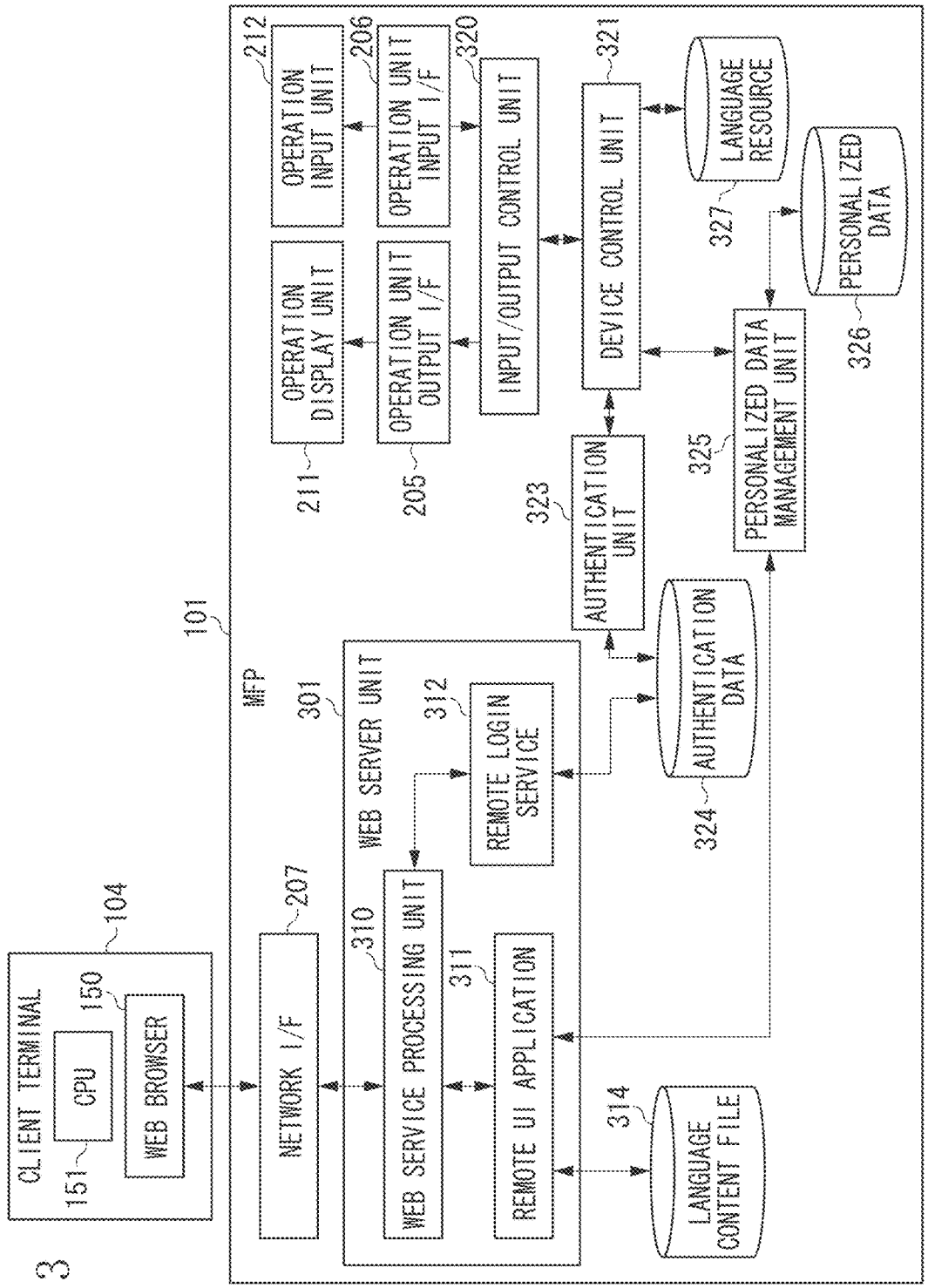
FIG. 3 illustrates an example of a functional block diagram of a client terminal and the MFP.

FIG. 3 illustrates an example of a functional block diagram of the client terminal 104 and the MFP 101.

The client terminal 104 includes a web browser 150 and a CPU 151. The web browser 150 accesses the MFP 101, and is provided with a web service. The CPU 151 controls the entire client terminal 104.

The MFP 101 includes a network I/F 207 to a language resource 327. Each of processing units included in the MFP 101 is implemented when the CPU 201 in the MFP 101 reads out and executes a control program stored in the ROM 203 or the HDD 204. A language content file 314, authentication data 324, personalized data 326, and the language resource 327 are stored in a predetermined storage unit (e.g., the HDD 204) in the MFP 101.

The network I/F 207 communicates with the web browser 150 in the external client terminal 104. The network I/F 207 transmits a request message to a web server unit 301 that provides a web service. The network I/F 207 receives a response message from the web server unit 301 and transmits screen data to the web browser 150, and then the web browser 150 displays a screen based on the screen data. In this example, the web browser 150 receives operation screen data from the web server unit 301, and displays an operation screen for operating the MFP 101 based on the operation screen data. The web browser 150 in the client terminal 104 can receive various services in addition to being provided with the operation screen data using the web service.

The client terminal 104 can have an individual personal setting environment as a personal computer. The personal setting environment also includes a display language, screen color reversal, etc. about accessibility. The personal setting environment of the client terminal 104, together with private information of the client terminal, can be stored and referred to. The web browser 150 can also have setting information such as display language information. The setting information can be transmitted to the web server unit 301 as request information from the web browser 150. The request information is AcceptLanguage serving as http header information about the web browser 150, for example.

A configuration of the web server unit 301 will be described. The web server unit 301 includes a web service processing unit 310, a remote user interface (UI) application 311, and a remote login service 312. The web service processing unit 310 has a function as a HyperText Transfer Protocol (HTTP) service for receiving a request message from the web browser 150 and determining with which web application service it communicates according to the request message. More specifically, the web service processing unit 310 receives a Uniform Resource Locator (URL) and a parameter as the request message, analyzes the received URL and parameter, and specifies a request. Then, the web service processing unit 310 performs processing according to the request, and returns a response thereto to the web browser 150.

The web service processing unit 310 calls the remote login service 312 to receive the web application service and performs login processing (authentication processing) when it receives a first request from the web browser 150. The remote control service 312 performs the authentication processing, and returns an authentication processing result to the web service processing unit 310. The web service processing unit 310 performs processing for calling an application requested from the web browser 150 based on the returned authentication processing result.

The remote UI application 311 is called from the web service processing unit 310 to receive the request message as well as authentication information from the web service processing unit 310. Then, the remote UI application 311 performs screen generation instruction processing based on the request message to provide a web service. More specifically, the remote UI application 311 analyzes a tag name and header information in a HyperText Markup Language (HTML) as parameters of the request message requested from the web browser 150. In this analysis, the above described AcceptLanguage information can also be referred to.

The remote UI application 311 calls a content of an appropriate language set from the language content file 314, and generates an HTML screen. If a screen on which a display language is English is to be generated, for example, the remote UI application 311 reads out a content (file) in English from the language content file 314, and generates an HTML screen. The generated HTML screen is transmitted as a response screen to the client terminal 104 via the network I/F 207. The web browser 150 in the client terminal 104 displays the transmitted response screen. The remote UI application 311 acquires or sets the personalized data 326 associated with a user corresponding to the above described authentication information via a personalized data management unit 325.

The remote login service 312 performs the authentication processing requested from the web server unit 301 based on information about the authentication data 324. More specifically, the remote login service 312 generates a screen (not illustrated) for requesting input of an identification (ID) and a password for authentication when called from the web service processing unit 310. The remote login service 312 transmits the generated screen to the web browser 150 in the client terminal 104 and displays the transmitted screen.

The remote login service 312 searches the authentication data 324 for information regarding an ID and a password when it receives an authentication request after an ID and a password for authentication are input to the above described generated screen, determines whether the ID and the password searched for respectively match the ID and the password for authentication, and performs authentication processing. If the authentication has been successfully performed, the remote login service 312 returns an authentication result to the web service processing unit 310, as described above. The web service processing unit 310 calls an application requested by the web browser 150 based on the above described authentication processing result. If the authenticate has been unsuccessfully performed, the remote login service 312 can also generate an error screen, transmit the generated error screen to the web browser 150 in the client terminal 104, and display the transmitted error screen.

A processing unit that performs input/output control of an operation panel of the MFP 101 will be mainly described. An input/output control unit 320 transmits a generated operation screen to the operation panel of the MFP 101, and receives an instruction to operate the operation screen. More specifically, the input/output control unit 320 displays a screen to be displayed on the operation panel of the MFP 101 on the operation display unit 211 via the operation unit output I/F 205. The input/output control unit 320 receives an operation instruction from the user with the operation input unit 212 via the operation unit input I/F 206.

A device control unit 321 generates a screen to be displayed on the operation panel upon receiving a request from the input control unit 320. More specifically, the device control unit 321 uses an ID and a display language of a requested screen to read out the screen from the language resource 327, and arranges a button on the screen to generate a screen. Thus, the language resource 327 has screen data corresponding to the display language. The generated screen is displayed on the operation display unit 211 via the input/output control unit 320. The generated screen also includes a screen to which information regarding an ID and a password required in an authentication unit 323 is input.

The authentication unit 323 is called from the device control unit 321 when authentication processing is required, and performs the authentication processing. More specifically, the authentication unit 323 acquires an ID and a password for authentication when called from the device control unit 321. The authentication unit 323 searches the authentication data 324 for information regarding an ID and a password, determines whether the ID and the password searched for respectively match the ID and the password for authentication, and performs authentication processing. The authentication unit 323 returns an authentication result to the device control unit 321. The device control unit 321 performs screen control based on the returned authentication result.

The personalized data management unit 325 is called from the device control unit 321 or the remote UI application 311, to manage the personalized data 326 in the MFP 101. More specifically, the personalized data management unit 325 associates the personalized data 326 with a user ID and stores the associated personalized data in the storage unit in response to an instruction from the device control unit 321 or the remote UI application 311. The personalized data management unit 325 reads out and return the personalized data associated with the user ID in response to the instruction from the device control unit 321 or the remote UI application 311.

FIG. 4 illustrates a data configuration of the authentication data 324.

The authentication data 324 has, for each user, information 401 required in performing user authentication, such as a user ID 402, a user name 403, and a password 404. The information are previously registered in the MFP 101 by the user (mainly an administrator).

Return to description illustrated in FIG. 3. The authentication unit 323 and the remote login service 312 check whether the input user name and password respectively match the user name and the password in the authentication data 324. If the user names and the passwords do not respectively match each other, the authentication unit 323 and the remote login service 312 determine that the authentication has been unsuccessfully performed, and notify the user that the authentication has been unsuccessfully performed. If the user names and the passwords respectively match each other, the authentication unit 323 and the remote login service 312 determine that the authentication has been successfully performed, and change an authentication state from a non-login state to a login state.

FIG. 5 illustrates a data configuration of the personalize data 326.

The personalized data 326 has setting information 501 for the MFP 101 that can be stored for each user. The setting information 501 includes the user ID 402, screen color reversal 502, an audio mode 503, a display language 504, a magnifier 505, and a personal address 506. The setting information 501 illustrated in FIG. 5 is an example. The personalized data 326 may include at least one of the screen color reversal 502 to the magnifier 505, which are associated with the user.

The screen color reversal 502 is a setting as to whether a color of a screen of the operation display unit 211 is reversed. The audio mode 503 is a setting as to whether an audio key operation function and an audio generation operation function are validated. The audio key operation function is a function of notifying the user of a content required for an operation of the MFP 101 as an audio guidance. The audio generation operation function is a function of performing user input using a keyword obtained by analyzing and recognizing audio generation by the user. The display language 504 is a setting relating to a display language to be displayed on the operation display unit 211. The magnifier 505 is a setting as to whether a function of enlarging characters to be displayed on the operation display unit 211 is validated. The personal address 506 is a setting of an e-mail address for each user.

Return to description illustrated in FIG. 3. The device control unit 321 reads the setting information 501 of the personalized data 326 associated with the user ID 402 representing the authenticated user by the personalized data managing unit 325 when the authentication unit 323 has successfully performed the authentication, and reflects a setting represented by the setting information 501 on the MFP 101.

Figures 6, 6A:
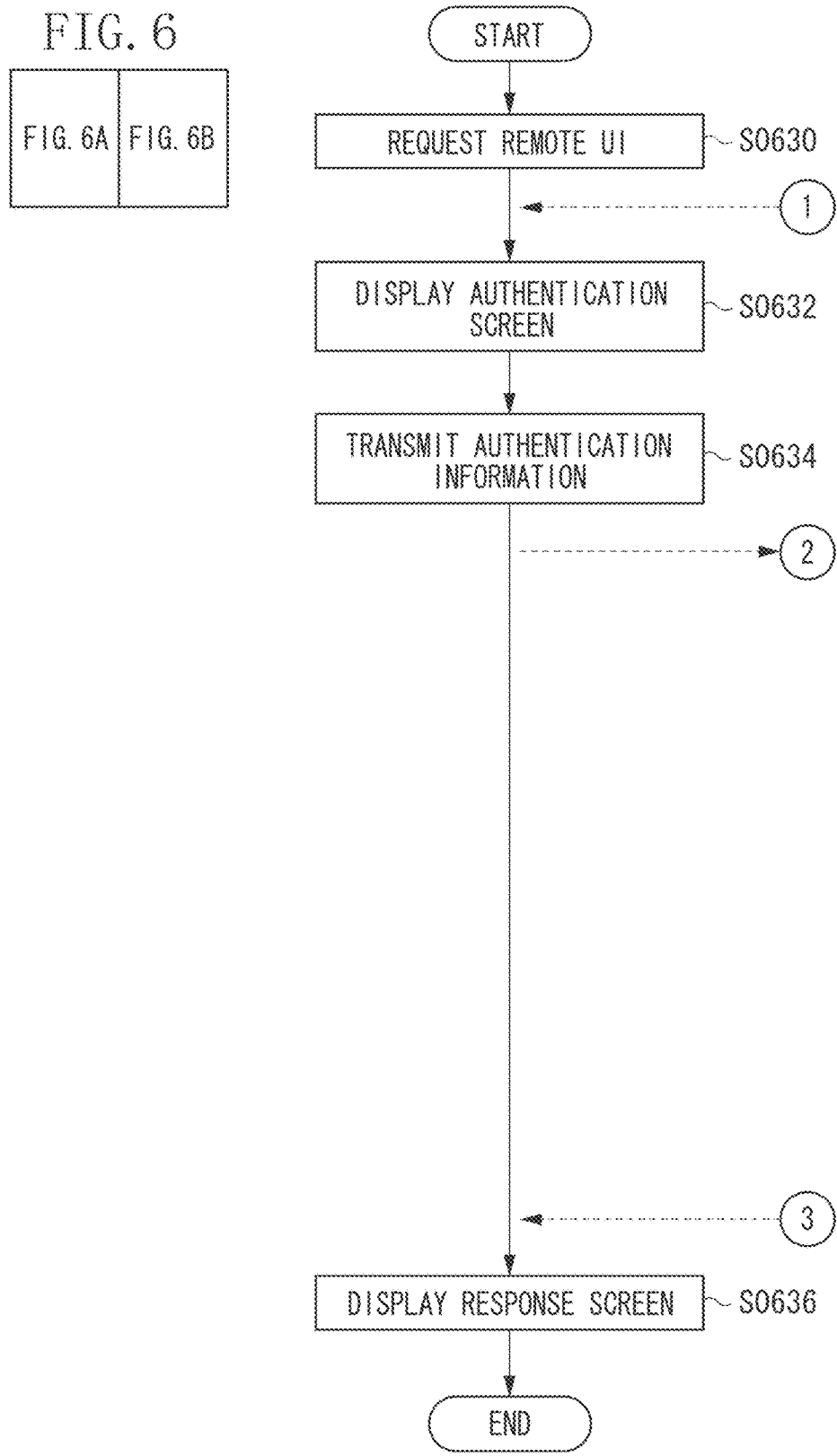
FIG. 6, composed of FIG. 6A and FIG. 6B, is a flowchart illustrating operation processing of the client terminal and the MFP.

FIG. 6, composed of FIG. 6A and FIG. 6B, is a flowchart illustrating operation processing of the client terminal 104 and the MFP 101 in a first exemplary embodiment.

In the first exemplary embodiment, the MFP 101 switches a style sheet set on a response screen to be transmitted to the web browser 150 according to a display setting for each user of the operation unit in the MFP 101 when the MFP 101 is accessed from the web browser 150 via a network. The style sheet is display definition information for defining a display format when the web browser 150 displays the response screen. In this example, the MFP 101 sets the style sheet to be displayed in a display format according to the display setting of the operation unit in the MFP 101, which is associated with the user who has accessed the MFP 101.

Processes in steps S0630 to S0636 illustrated in FIG. 6 are executed in response to an instruction issued by the CPU 151 in the client terminal 104. Processes in steps S0602 to S0628 are executed in response to an instruction issued by the CPU 201 in the MFP 101. The display setting for each user in the MFP 101 is previously performed by the user (mainly an administrator).

In step S0630, the web browser 150 in the client terminal 104 requests an information/operation screen (remote UI) of the MFP 101 to the web server unit 301 in the MFP 101. The operation screen is a screen for performing input to operate the MFP 101. In step S0602, the web service processing unit 310 then determines whether the web browser 150 in the client terminal 104 has requested the information/operation screen (remote UI) of the MFP 101. If the web service processing unit 310 determines that the remote UI has not been requested (NO in step S0602), the process in step S0602 is repeated. If the web service processing unit 310 determines that the remote UI has been requested (YES in step S0602), the web service processing unit 310 requests an authentication screen to the remote login service 312. In step S0604, the web service processing unit 310 transmits the authentication screen to the client terminal 104.

In step S0632, the web browser 150 in the client terminal 104 displays the authentication screen that has been transmitted from the MFP 101 in step S0604. In step S0634, the web browser 150 in the client terminal 104 transmits authentication information (a user ID and a password) input by the user to the web server unit 301 in the MFP 101.

In step S0606, the web service processing unit 310 causes the remote login service 312 to check whether authentication has been successfully performed based on the user ID and the password that have been transmitted from the web browser 150 in the client terminal 104 in step S0634. The remote login service 312 checks whether the user ID and the password, which have been received from the web service processing unit 310, respectively match a user name and a password in the authentication data 324. If the remote login service 312 determines that the user IDs and the passwords do not respectively match each other (NO in step S0606), the web service processing unit 310 determines that authentication has been unsuccessfully performed. In step S0628, the web service processing unit 310 sets an error screen as a response screen to the client terminal 104, and the processing proceeds to step S0624. In step S0624, the web service processing unit 310 transmits the response screen to the client terminal 104.

If the remote login service 312 determines that the user IDs and the passwords respectively match each other (YES in step S0606), the web service processing unit 310 determines that authentication has been successfully performed. The web service processing unit 310 sends the user ID and the password to the remote UI application 311.

In step S0608, the remote UI application 311 inquires of the personalized data management unit 325 the display setting of the operation unit in the MFP 101, which is associated with the user represented by the user ID sent from the web service processing unit 310, based on information about the user ID. More specifically, the remote UI application 311 inquires about the personalized data 326. The personalized data management unit 325 acquires the display setting of the operation unit in the MFP 101 for the user from the personalized data 326, and returns the acquired display setting to the remote UI application 311.

The remote UI application 311 then executes determination processing, described below, based on the display setting returned from the personalized data management unit 325. In step S0610, the remote UI application 311 determines whether there is a screen color reversal setting in the display setting. If the screen color reversal setting exists in the display setting (YES in step S0610), the processing proceeds to step S0614. If the screen color reversal setting does not exist in the display setting (NO in step S0610), the processing proceeds to step S0612.

In step S0614, the remote UI application 311 determines whether there is a magnifier setting in the display setting. If the magnifier setting exists in the display setting (YES in step S0614), the processing proceeds to step S0620. If the magnifier setting does not exist in the display setting (NO in step S0614), the processing proceeds to step S0622.

In step S0612, the remote UI application 311 determines whether there is a magnifier setting in the display setting. If the magnifier setting exists in the display setting (YES in step S0612), the processing proceeds to step S0618. If the magnifier setting does not exist in the display setting (NO in step S0612), the processing proceeds to step S0616.

In step S0616, the remote UI application 311 generates a response screen to the client terminal 104. More specifically, the remote UI application 311 calls a content corresponding to a display language included in the display setting from the language content file 314, and generates a response screen based on the called content. Such processing is also executed in steps S0618, S0620, and 0622, described below. The remote UI application 311 sets a normal style sheet on the generated response screen.

In step S0618, the remote UI application 311 sets a style sheet for character size enlargement on the response screen to the client terminal 104. In step S0620, the remote UI application 311 sets a style sheet for both screen color reversal and character size enlargement on the response screen to the client terminal 104. In step S0622, the remote UI application 311 sets a style sheet for screen color reversal on the response screen to the client terminal 104.

The response screen on which the style sheets are set in steps S0616, S0618, S0620, and S0622 is data representing the operation screen of the MFP 101 (operation screen data). The operation screen data is data in an HTML format.

Figure 7:
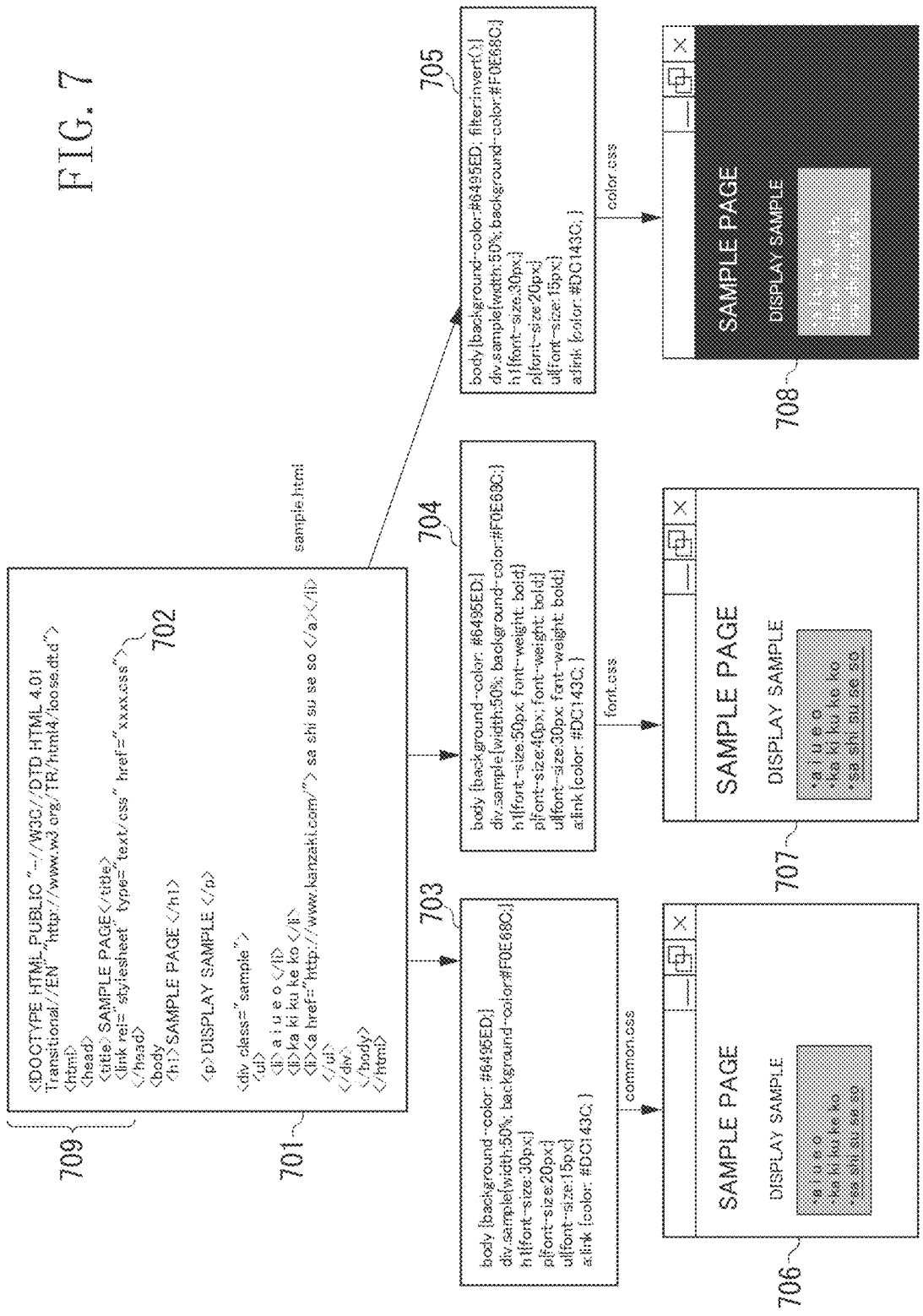
FIG. 7 illustrates respective style sheets set on a response screen.

FIG. 7 illustrates respective style sheets set on a response screen.

An HTML 701 represents response screen data. Style sheets 703, 704, and 705 are Cascading Style Sheets (CSS) for designating display on the HTML 701.

In a description 709 in the HTML 701, <!DOCTYPE> first declares Document Type Definition (DTD). The HTML 701 defines, for each version, names of elements (tags) and attributes usable in the version and a manner of arrangement of the elements and the attributes. The definition is referred to as DTD. In the HTML, <!DOCTYPE> declares according to which DTD description is given, and <html> declares that a document is an HTML document.

Header information such as a document title is described between a <head> and </head>, and <title> gives a title to the document. An external style sheet can be read, like in a description 702. For example, a file name representing the style sheet 703, 704, or 705 is described in the description 702. When the description of the file name is rewritten, display in the web browser 150 is switched to the display 706, 707, or 708. The style sheet 703 is a normal style sheet. The style sheet 704 is a style sheet for character size enlargement. The style sheet 705 is a style sheet for screen color reversal.

The style sheet on the information/operation screen (remote UI) of the MFP 101 is switched to a style sheet according to the display setting of the MFP 101, which is associated with the user, by setting the style sheet in steps S0616, S0618, S0620, or S0622 illustrated in FIG. 6.

In step S0624, the web service processing unit 310 transmits a response screen to the client terminal 104, and processing on the side of the MFP 101 ends. In step S0636, the web browser 150 in the client terminal 104 displays the response screen transmitted from the web service processing unit 310 in the MFP 101. The web browser 150 displays, when the style sheet is set on the response screen, the response screen in a display format according to the style sheet.

Therefore, the MFP 101 switches the style sheet on the response screen displayed by the web browser 150 based on the display setting of the operation unit set for each user. More specifically, the remote UI application 311 sets the style sheet on the response screen to perform control so that the display on the operation screen of the MFP 101 on the side of the client terminal 104 becomes display according to the display setting of the operation unit in the MFP 101, which is associated with a user of the client terminal. Thus, the display according to the display setting of the operation unit in the MFP 101 can be performed without performing a setting on the side of the client terminal 104.

Figure 8B:
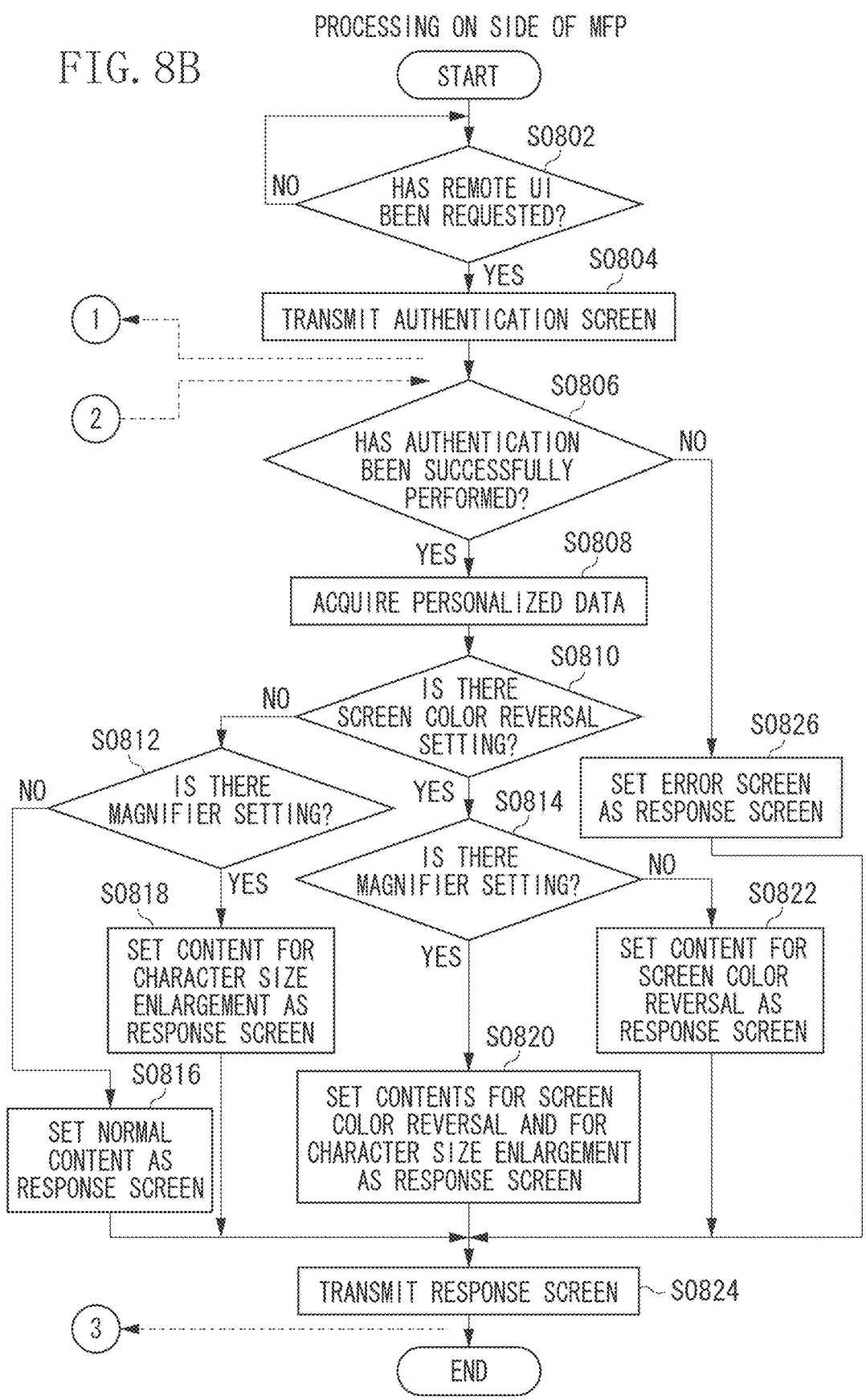
FIG. 8, composed of FIG. 8A and FIG. 8B, is a flowchart illustrating operation processing of a client terminal and an MFP.

FIG. 8, composed of FIG. 8A and FIG. 8B, is a flowchart illustrating operation processing of a client terminal and an MFP in a second exemplary embodiment.

In the second exemplary embodiment, a content edited according to a display setting of an operation unit in an MFP 101 is previously stored as a language content file 314. When the MFP 101 is accessed from a web browser 150 via a network, the MFP 101 acquires the content edited according to the display setting of the operation unit in the MFP 101, sets the content as a response screen, and transmits the set content to the web browser 150.

Steps S0828 to S0834, S0802 to S0814, and S0826 are similar to steps S0630 to S0636, S0602 to S0614, and S0628 illustrated in FIG. 6, and hence description thereof is not repeated.

In steps S0810, S0812, and S0814, a remote UI application 311 executes determination processing relating to the display setting of the operation unit in the MFP 101. In steps S0816, S0818, S0820, and S0822, the remote UI application 311 acquires a content corresponding to a result of the determination processing from the language content file 314, and sets the acquired content as a response screen.

More specifically, in step S0816, the remote UI application 311 acquires a normal content from the language content file 314, and sets the acquired content as a response screen. In step S0818, the remote UI application 311 acquires a content for character size enlargement from the language content file 314, and sets the acquired content as a response screen. The content for character size enlargement is a content edited to be displayed with a character size enlarged and with extra items reduced. Thus, a highly readable operation screen can be provided.

In step S0822, the remote UI application 311 acquires a content for screen color reversal from the language content file 314, and sets the acquired content as a response screen. The content for screen color reversal is a content edited to be displayed with a screen color reversed. In step S0820, the remote UI application 311 acquires the respective contents for screen color reversal and for character size enlargement from the language content file 314, and sets the acquired contents as a response screen. The contents for character size enlargement and for character size enlargement are contents edited to be displayed with a screen color reversed, with a character size enlarged, and with extra items reduced. The remote UI application 311 may change operability or an operation flow in the screen depending on a content of the display setting.

In step S0824, a web service processing unit 310 transmits a response screen to a client terminal 104, and processing on the side of the MFP 101 ends. In step S0834, the web browser 150 in the client terminal 104 displays the response screen transmitted from the web service processing unit 310 in the MFP 101, and processing on the side of the client terminal 104 ends.

Therefore, the MFP 101 transmits a response screen where a display content and items are edited to the client terminal 104 based on the display setting set for each user, to enable display according to the display setting of the MFP 101 without performing a setting on the side of the client terminal 104.

FIG. 9, composed of FIG. 9A and FIG. 9B, is a flowchart illustrating operation processing of a client terminal 104 and an MFP 101 in a third exemplary embodiment.

In the third exemplary embodiment, the MFP 101 inquires of the client terminal 104 whether display according to a display setting of an operation unit in the MFP 101 is performed.

Steps S0936 to S0940, S0902 to S0908, and S0934 are similar to steps S0630 to S0634, S0602 to S0608, and S0628 illustrated in FIG. 6, and hence description thereof is not repeated.

In step S0910, a remote UI application 311 determines whether the display setting of the operation unit in the MFP 101, which is associated with a user in an access source, based on personalized data acquired from a personalized data management unit 325. If it is determined that the display setting of the operation unit in the MFP 101, which is associated with the user, has not been performed (NO in step S0910), then in step S0922, the remote UI application 311 sets a normal style sheet.

If it is determined that the display setting of the operation unit in the MFP 101, which is associated with the user, has been performed (YES in step S0910), then in step S0912, the remote UI application 311 transmits a confirmation screen 1001 for inquiring of a web browser 150 whether display according to the display setting of the operation unit in the MFP 101 is performed, to be displayed. The display according to the display setting of the operation unit in the MFP 101 is display that matches the display setting of the operation unit in the MFP 101.

Figure 10:
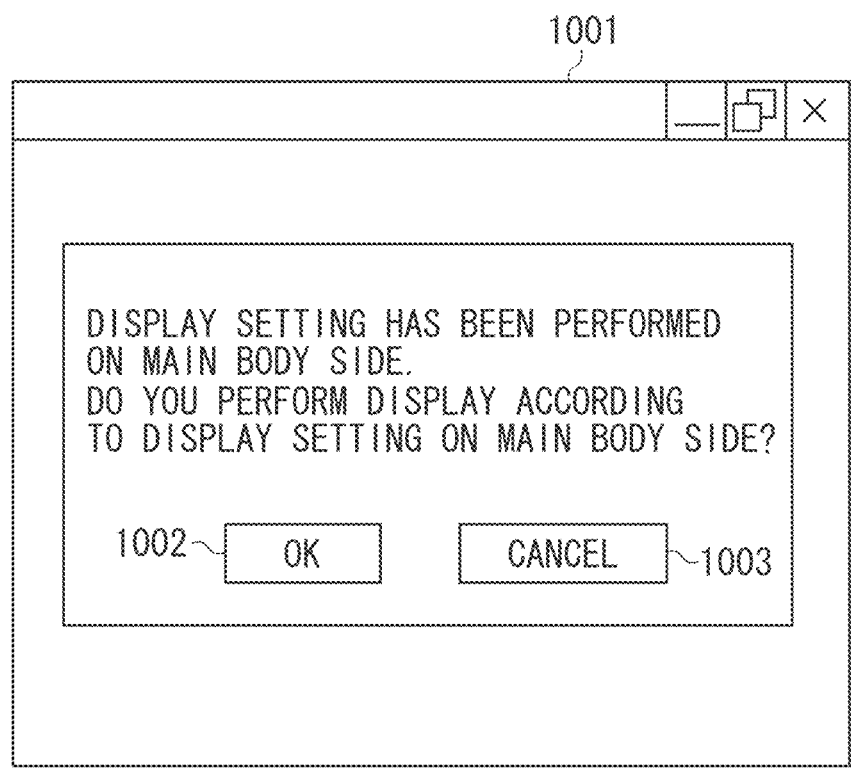
FIG. 10 illustrates the operation processing of the client terminal and the MFP.

FIG. 10 illustrates an example of the confirmation screen 1001.

When the user presses a button 1002, display according to the display setting of the operation unit in the MFP 101 is selected. When the user presses a button 1003, non-display according to the display setting of the operation unit in the MFP 101 is selected.

Return to description illustrated in FIG. 9. In step S0942, the web browser 150 in the client terminal 104 notifies the MFP 101 of selection information representing selection on the confirmation screen 1001 by the user. In step S0914, the remote UI application 311 then determines whether a setting according to the display setting of the operation unit in the MFP 101 is performed based on the selection information.

If the selection information indicates that display according to the display setting of the operation unit in the MFP 101 is performed, the remote UI application 311 determines that the setting according to the display setting of the operation unit in the MFP 101 is performed (YES in step S0914), and processing proceeds to step S0916. If the selection information indicates that display according to the display setting of the operation unit in the MFP 101 is not performed, the remote UI application 311 determines that the setting according to the display setting of the operation unit in the MFP 101 is not performed (NO in step S0914), and processing proceeds to step S0922. Steps S0916 to S0928, S0932, and S0944 are similar to steps S0610 to S0622, S0624, and S0636 illustrated in FIG. 6, and hence description thereof is not repeated.

According to the third exemplary embodiment, if the MFP 101 is accessed from the web browser 150 in the client terminal 104, the user can select whether a display setting of an operation screen by the web browser 150 matches the display setting of the operation unit in the MFP 101.

Each of the above described exemplary embodiments do not limit the invention as set forth in the claims, and all combinations of characteristics described in the exemplary embodiments are not always essential for a solution of the invention. The third exemplary embodiment and the second exemplary embodiment may be combined with each other. More specifically, between steps S0808 to S0810, processes in steps S0910, S0912, S0942, and S0914 illustrated in FIG. 9 may be performed.

As described above, according to the image processing apparatus in each of the above described exemplary embodiments, if the user of the information processing apparatus accesses the image processing apparatus via the network, the operation screen of the image processing apparatus can be displayed in a display format desired by the user in the information processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus including a Web server and capable of communicating with an information processing apparatus including a Web browser via a network, the image processing apparatus comprising:
   a display;
   one or more memories storing a display setting of the display in association with user identification information about a user permitted to log in to the image processing apparatus, the display being capable of displaying a screen based on the display setting of the display stored in the one or more memories in association with user identification information about a user that has logged in to the image processing apparatus; and
   one or more processors that execute a set of instructions to:
   receive user identification information from the Web browser of the information processing apparatus;
   obtain the display setting of the display stored in association with the received user identification information in the one or more memories; and
   transmit a Web screen based on the obtained display setting to the information processing apparatus.

2. The image processing apparatus according to claim 1, wherein the one or more processors execute an instruction to transmit, to the information processing apparatus, a Web screen in which display definition information for displaying in a display form according to the obtained display setting is set.

3. The image processing apparatus according to claim 2, wherein the Web screen to be transmitted is data in an HTML format and the display definition information is a style sheet.

4. The image processing apparatus according to claim 1, wherein the one or more processors execute an instruction to transmit, to the information processing apparatus, a Web screen in which a display content or an item is edited according to the obtained display setting.

5. The image processing apparatus according to claim 1, wherein the one or more processors execute instructions to:
   authenticate a user indicated by the user identification information received from the Web browser of the information processing apparatus; and obtain the display setting of the display stored in association with the received user identification information in the one or more memories, according to success in authentication, and transmit a Web screen based on the obtained display setting to the information processing apparatus.

6. The image processing apparatus according to claim 1, wherein the Web screen is an operation screen for remotely operating the image processing apparatus.

7. The image processing apparatus according to claim 1, wherein the display setting of the display includes a setting about a display language of the display.

8. The image processing apparatus according to claim 1, wherein the display setting of the display includes one of a setting about color reversal of a screen to be displayed on the display and a setting about enlargement of a character to be displayed on the display.

9. An image processing apparatus including a Web server and capable of communicating with an information processing apparatus including a Web browser via a network, the image processing apparatus comprising:
    a display;
    one or more memories storing a display setting of the display in association with user identification information about a user permitted to log in to the image processing apparatus, the display being capable of displaying a screen based on the display setting of the display stored in the one or more memories in association with user identification information about a user that has logged in to the image processing apparatus; and
    one or more processors that execute a set of instructions to:
    receive user identification information from the Web browser of the information processing apparatus;
    generate a Web screen based on the display setting of the display stored in association with the received user identification information in the one or more memories; and
    transmit the generated Web screen to the information processing apparatus.

10. A method for an image processing apparatus including a Web server and capable of communicating with an information processing apparatus including a Web browser via a network, the method comprising:
    storing a display setting of a display in association with user identification information about a user permitted to log in to the image processing apparatus in one or more memories;
    displaying, on the display, a screen based on the display setting of the display stored in the one or more memories in association with user identification information about a user that has logged in to the image processing apparatus;
    receiving user identification information from the Web browser of the information processing apparatus;
    obtaining the display setting of the display stored in association with the received user identification information in the one or more memories; and
    transmitting a Web screen based on the obtained display setting to the information processing apparatus.

11. The method according to claim 10, further comprising executing an instruction to transmit, to the information processing apparatus, a Web screen in which display definition information for displaying in a display form according to the obtained display setting is set.

12. The method according to claim 11, wherein the Web screen to be transmitted is data in an HTML format and the display definition information is a style sheet.

13. The method according to claim 10, further comprising executing an instruction to transmit, to the information processing apparatus, a Web screen in which a display content or an item is edited according to the obtained display setting.

14. The method according to claim 10, further comprising:
    authenticating a user indicated by the user identification information received from the Web browser of the information processing apparatus; and
    obtaining the display setting of the display stored in association with the received user identification information in the one or more memories, according to success in authentication, and transmitting a Web screen based on the obtained display setting to the information processing apparatus.

15. The method according to claim 10, wherein the Web screen is an operation screen for remotely operating the image processing apparatus.

16. The method according to claim 10, wherein the display setting of the display includes a setting about a display language of the display.

17. The method according to claim 10, wherein the display setting of the display includes one of a setting about color reversal of a screen to be displayed on the display and a setting about enlargement of a character to be displayed on the display.

18. A method for an image processing apparatus including a Web server and capable of communicating with an information processing apparatus including a Web browser via a network, the method comprising:
    storing a display setting of a display in association with user identification information about a user permitted to log in to the image processing apparatus in one or more memories;
    displaying, on the display, a screen based on the display setting of the display stored in the one or more memories in association with user identification information about a user that has logged in to the image processing apparatus;
    receiving user identification information from the Web browser of the information processing apparatus;
    generating a Web screen based on the display setting of the display stored in association with the received user identification information in the one or more memories; and
    transmitting the generated Web screen to the information processing apparatus.

19. A non-transitory computer readable storage medium storing a computer-executable program of instructions for causing a computer to perform a method for an image processing apparatus including a Web server and capable of communicating with an information processing apparatus including a Web browser via a network, the method comprising:
    storing a display setting of a display in association with user identification information about a user permitted to log in to the image processing apparatus in one or more memories;
    displaying, on the display, a screen based on the display setting of the display stored in the one or more memories in association with user identification information about a user that has logged in to the image processing apparatus;

receiving user identification information from the Web browser of the information processing apparatus;

obtaining the display setting of the display stored in association with the received user identification information in the one or more memories; and transmitting a Web screen based on the obtained display setting to the information processing apparatus.

20. The non-transitory computer readable storage medium according to claim 19, further comprising executing an instruction to transmit, to the information processing apparatus, a Web screen in which display definition information for displaying in a display form according to the obtained display setting is set.

21. The non-transitory computer readable storage medium according to claim 20, wherein the Web screen to be transmitted is data in an HTML format and the display definition information is a style sheet.

22. The non-transitory computer readable storage medium according to claim 19, further comprising executing an instruction to transmit, to the information processing apparatus, a Web screen in which a display content or an item is edited according to the obtained display setting.

23. The non-transitory computer readable storage medium according to claim 19, further comprising:

authenticating a user indicated by the user identification information received from the Web browser of the information processing apparatus; and obtaining the display setting of the display stored in association with the received user identification information in the one or more memories, according to success in authentication, and transmitting a Web screen based on the obtained display setting to the information processing apparatus.

24. The non-transitory computer readable storage medium according to claim 19, wherein the Web screen is an operation screen for remotely operating the image processing apparatus.

25. The non-transitory computer readable storage medium according to claim 19, wherein the display setting of the display includes a setting about a display language of the display.

26. The non-transitory computer readable storage medium according to claim 19, wherein the display setting of the display includes one of a setting about color reversal of a screen to be displayed on the display and a setting about enlargement of a character to be displayed on the display.

27. A non-transitory computer readable storage medium storing a computer-executable program of instructions for causing a computer to perform a method for an image processing apparatus including a Web server and capable of communicating with an information processing apparatus including a Web browser via a network, the method comprising:

storing a display setting of a display in association with user identification information about a user permitted to log in to the image processing apparatus in one or more memories;

displaying, on the display, a screen based on the display setting of the display stored in the one or more memories in association with user identification information about a user that has logged in to the image processing apparatus;

receiving user identification information from the Web browser of the information processing apparatus;

generating a Web screen based on the display setting of the display stored in association with the received user identification information in the one or more memories; and transmitting the generated Web screen to the information processing apparatus.

\* \* \* \* \*